United States Patent Office 2,915,396
Patented Dec. 1, 1959

2,915,396

DIAZOTYPES CONTAINING 2,2'-ALKYLENEBIS-(1,3-CYCLOHEXANEDIONES) AS AZO COMPONENTS

Douglas Straw, Binghamton, N.Y., assignor to General Aniline & Film Corporation, New York, N.Y., a corporation of Delaware No Drawing. Application July 16, 1957
Serial No. 672,130

6 Claims. (Cl. 96—91)

This invention relates to diazotype photoprinting materials and particularly to such materials containing 2,2'-alkylenebis(1,3-cyclohexanediones) as the azo coupling components therefor.

In the production of diazotype materials, it is often desirable to produce a copy having a distinctive color such as a maroon dye on a clear white background. Heretofore, maroon dye images were obtained by one of three procedures. One method employs the use of naphthalene-2-diazo-1-oxide-5-sulfonic acid and phloroglucinol. The background areas of prints from this particular combination tend to discolor on standing. Furthermore, the particular diazo compound employed does not possess the necessary light-sensitive efficiency.

A second method involves the combination of p-phenylene-diamine diazos and an arylmethylpyrazolone or a hydroxynaphthimidazole. The pyrazolones produce coatings which precouple excessively while the red colors produced from the naphthimidazoles are displeasing to the eye.

Still another method of producing maroon dye images is disclosed in U.S. Patent 2,500,099 and employs a light-sensitive diazo compound and a coupling component derived from cyclohexanedione of the following general formula:

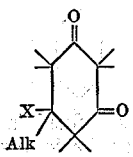

wherein X can be hydrogen or alkyl groups and Alk is alkyl.

Although these compounds produce desirable maroon images, the stability of coated materials containing said compounds is poor unless excessively large quantities of strong stabilizing agents such as sulfosalicyclic acid are incorporated. Such large amounts of stabilizers as are necessary in order to use these couplers successfully cause severe degradation of the physical properties, i.e., strength, tear, and fold of the base material coated. In addition to the detrimental effects on the base material, the aforesaid stabilized coatings produce unacceptably high fog and haze levels.

It is therefore an object of this invention to provide a photoprinting material which contains a coupling component capable of coupling with a light-sensitive diazo compound to form red azo dye images.

It is a further object to provide photoprinting materials which contain a coupling component which will couple with a light-sensitive diazo compound to form red azo dye images, said coupling component being characterized by high stability and keeping qualities.

Other objects will appear hereinafter as the description proceeds.

I have discovered that light-sensitive diazotype materials, capable of producing maroon images without the disadvantages of the methods heretofore in vogue, are obtained by using as the coupling component, a 2,2'-alkylenebis(1,3-cyclohexanedione) of the following general formula:

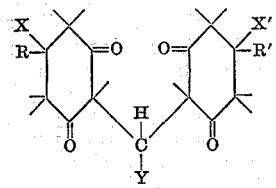

wherein R and R' represent alkyl groups, i.e., methyl, ethyl, n-propyl, n-butyl, etc.; X and X' can be hydrogen or alkyl groups as above, and Y is alkyl, i.e., methyl, ethyl, n-propyl, n-butyl, sec.-butyl, n-amyl, n-hexyl, n-heptyl, n-octyl, n-nonyl, etc.; a hydroxyalkyl group, i.e., hydroxyethyl, 2-hydroxypropyl, etc.; an aryl radical, i.e., phenyl, hydroxyphenyl, alkoxyphenyl, e.g., methoxyphenyl, ethoxyphenyl, n-propoxyphenyl, etc.; halophenyl, e.g., chlorophenyl, bromophenyl, etc.; a phenylpolyene grouping, i.e., styryl, phenyl-1,3-butadienyl, etc.; or a heterocyclic ring, i.e., furyl, quinolyl, pyridyl, thienyl, etc.

Representative biscyclohexanedione azo coupling components are typified in the following list:

2,2' - ethylidenebis[5,5 - dimethyl - 1,3 - cyclohexanedione]
2,2' - butylidenebis[5,5 - dimethyl - 1,3 - cyclohexanedione]
2,2' - hexylidenebis[5,5 - dimethyl - 1,3 - cyclohexanedione]
2,2' - decylidenebis[5,5 - dimethyl - 1,3 - cyclohexanedione]
2,2' - tetradecylidenebis[5,5 - dimethyl - 1,3 - cyclohexanedione]
2,2' - (3 - hydroxybutylidene)bis[5,5 - dimethyl - 1,3-cyclohexanedione]
2,2' - phenethylidenebis[5,5 - dimethyl - 1,3 - cyclohexanedione]
2,2' - styrylmethylenebis[5,5 - dimethyl - 1,3 - cyclohexanedione]
2,2' - benzylidenebis[5,5 - dimethyl - 1,3 - cyclohexanedione]
2,2' - o - hydroxybenzylidenebis[5,5 - dimethyl - 1,3-cyclohexanedione]
2,2' - p - methoxybenzylidenebis[5,5 - dimethyl - 1,3-cyclohexanedione]
2,2' - (2 - furfurylidene)bis[5,5 - dimethyl - 1,3 - cyclohexanedione]

The aforesaid bis-1,3-cyclohexanediones are readily obtained by the reaction of 2 moles of a 1,3-cyclohexanedione and 1 mole of an aldehyde in an acidic medium. This reaction, as well as the bis-1,3-cyclohexanediones produced thereby, is known and described in the chemical literature and in this connection reference is made to the following journals:

Vorlander, Z. Anal. Chem., 77, 241 (1929).
Weinberger, Ind. Eng. Chem., Anal. Ed., 3, 365 (1931).
Horning and Horning, J. Org. Chem., 11, 95 (1946).

These biscyclohexanediones produce excellent brilliant red images against a clear white background and the coatings are characterized by a high resistance to precoupling without requiring excessive quantities of precoupling stabilizers. My new coupling components may be incorporated into a photoprinting material using any one of the several methods known to those experienced in the art. In a preferred embodiment, a suitable base such as a cellulose ester film is coated with a solution containing one of the aforementioned new azo couplers, a light-sensitive diazonium salt, a weak acid such as citric acid, and thiourea in an organic solvent or mixture of organic solvents, or a solution of organic solvents in water. The resulting mixture is then coated in the usual manner and exposed beneath a pattern and developed with ammonia or other suitable alkaline substances.

Solvents which I have found suitable as diluents for the coating solution include methyl Cellosolve, methyl Cellosolve acetate, alcohols, ketones, esters and water Other auxiliary materials such as stabilizers and preservatives may be added to the coating solutions as the particular coating system and substrate require.

The following examples illustrate methods of employing this present invention but it is to be understood that these examples are given by way of illustration and do not impose any limitations on the invention.

*Example I*

1 gram of 4-diethylamino-2-ethoxybenzene diazonium chloride, 1.5 g. of 2,2'-butylidenebis(5,5-dimethyl-1,3-cyclohexanedione), 1 g. of sulfosalicylic acid, and 0.5 g. of thiourea were dissolved in a solution of 55 parts of methyl alcohol, 35 parts of acetone, and 10 parts of methyl Cellosolve acetate. This solution was coated on a cellulose acetate foil and dried. Exposure beneath an appropriate original and subsequent development in ammonia fumes produced a brilliant, near-magenta print on a clear background.

*Example II*

1 gram of p-diethylaminobenzene diazonium chloride was substituted for the diazo employed in Example I and all other components and solvent ratios used in Example I were kept the same. This solution was coated on a cellulose acetate film and dried. Exposure beneath an original and subsequent development in ammonia fumes produced a brilliant red print on a clear background.

*Example III*

A solution of 3 g. of 2,2-phenethylidenebis(5,5-dimethyl-1,3-cyclohexanedione), 0.7 g. of 4-diethylamino-2-ethoxybenzene diazonium chloride, 1 g. of sulfosalicylic acid, and 1 g. of thiourea in 80 ml. of methyl Cellosolve and 10 ml. of acetone was coated on a cellulose acetate foil and dried. Exposure beneath an original and subsequent development in ammonia fumes produced a brilliant red print on a clear background.

*Example IV*

A solution of 3 g. of 2,2-n-tetradecylidenebis(5,5-dimethyl-1,3-cyclohexanedione), 0.7 g. of 4-diethylamino-2-ethoxybenzene diazonium chloride, 1 g. of sulfosalicylic acid, and 1 g. of thiourea in 80 ml. of methyl Cellosolve and 10 ml. of acetone was coated on a cellulose acetate film and dried. Exposure beneath an original and subsequent development in ammonia fumes produced a brilliant red print on a clear background.

*Example V*

A solution of 2 g. of 2,2-butylidenebis(5,5-dimethyl-1,3-cyclohexanedione), 2 g. of p-diethylaminobenzene diazonium chloride, 2 g. of citric acid and 1 g. of thiourea in 50 ml. of water, 20 ml. of isopropyl alcohol, 10 ml. of γ-butyrolactone, and 5 ml. of n-butyl alcohol was coated on a cellulose acetate foil. Exposure beneath an original and subsequent development in ammonia fumes produced a brilliant red print on a clear background.

*Example VI*

A solution of 3 g. of 2,2-benzylidenebis(5,5-dimethyl-1,3-cyclohexanedione), 0.7 g. of 4-diethylamino-2-ethoxybenzene diazonium chloride, 1 g. of sulfosalicylic acid, and 1 g. of thiourea in 80 ml. of methyl Cellosolve and 10 ml. of acetone was coated on cellulose acetate film. Exposure beneath an original and subsequent development in ammonia fumes produced a brilliant red print on a clear background.

I claim:

1. A diazotype photoprinting material having thereon a light-sensitive layer comprising a light-sensitive diazo compound and an azo coupling component of the class represented by the following formula:

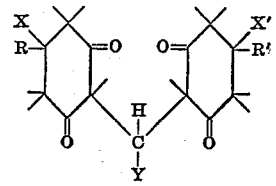

wherein R and R' are alkyl groups, X and X' are selected from the class consisting of hydrogen and alkyl groups and Y is selected from the class consisting of alkyl, hydroxyalkyl, aryl, and heterocyclic groups.

2. A diazotype photoprinting material as defined in claim 1 wherein R and R' are methyl and X and X' are hydrogen.

3. A composition as defined in claim 2 wherein the coupling component has the following formula:

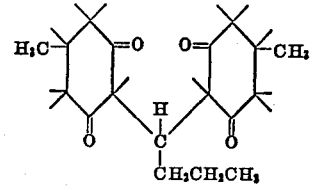

4. A composition as defined in claim 2 wherein the coupling component has the following formula:

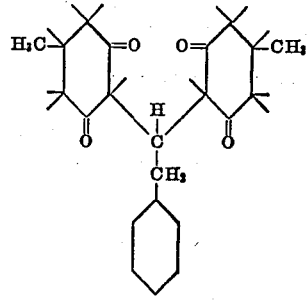

5. A composition as defined in claim 2 wherein the coupling component has the following formula:

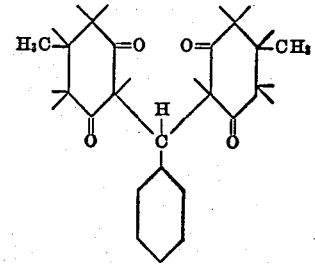

6. A composition as defined in claim 2 wherein the coupling component has the following formula:

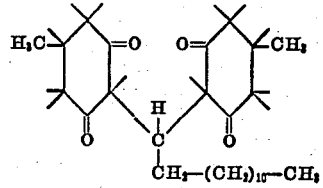

References Cited in the file of this patent
UNITED STATES PATENTS 2,500,099      Straley _____ Mar. 7, 1950